(12) United States Patent
Naruoka et al.

(10) Patent No.: US 7,992,911 B2
(45) Date of Patent: Aug. 9, 2011

(54) PICK-UP STYLE UTILITY VEHICLE WITH EXPANDABLE CARGO BED

(75) Inventors: Shohei Naruoka, Akashi (JP); Masaki Tanaka, Hirakata (JP); Yoshiya Takehara, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 12/649,780

(22) Filed: Dec. 30, 2009

(65) Prior Publication Data

US 2011/0156421 A1    Jun. 30, 2011

(51) Int. Cl.
*B60N 3/00*    (2006.01)
*B62D 33/02*    (2006.01)

(52) U.S. Cl. ............... 296/24.43; 296/26.11; 296/183.1; 296/183.2; 280/770

(58) Field of Classification Search ............... 296/24.43, 296/26.08, 26.11, 183.1, 183.2; 280/749
See application file for complete search history.

(56) References Cited

U.S. PATENT DOCUMENTS

| | | | |
|---|---|---|---|
| 3,319,584 A * | 5/1967 | Erickson | 410/134 |
| 6,905,159 B1 | 6/2005 | Saito et al. | |
| 6,994,388 B2 | 2/2006 | Saito et al. | |
| 7,249,798 B2 | 7/2007 | Saito et al. | |
| 7,581,780 B2 * | 9/2009 | Shimamura et al. | 296/183.2 |

* cited by examiner

*Primary Examiner* — Dennis Pedder
(74) *Attorney, Agent, or Firm* — Wenderoth, Lind & Ponack LLP

(57) ABSTRACT

A pick-up style utility vehicle has a front seat, a rear seat, and a cargo bed in this order from front, a cabin frame surrounding a riding space, and a screen shield partitioning the cargo bed and a rear riding space in front of the cargo bed. The cargo bed can be changed between an expanded state in which the cargo bed is expanded in a front direction to the rear riding space and a non-expanded state not occupying the rear riding space. The screen shield has a link mechanism. The screen shield is coupled to the upper portion of the cabin frame by the link mechanism so that the screen shield can be shifted between a position in the expanded state and a position in the non-expanded state.

6 Claims, 9 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications include, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 13 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 13, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify a moving operation of a screen shield with expanding and contracting operations of a cargo bed, thereby performing the operations easily and immediately even by one operator.

To achieve the above object, the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, the screen shield has a link mechanism, and the screen shield is coupled to the upper portion of the cabin frame by the link mechanism so that the screen shield can be shifted between a position in the expanded state and a position in the non-expanded state.

With the above configuration, the position of the screen shield can be changed between the expanded position and the non-expanded position without lifting the screen shield in the operation of expanding or contracting the cargo bed. That is, the position of the screen shield can be easily changed by one operator.

According to the present invention, preferably, the link mechanism has a pair of right and left first arms rotatably coupled to the upper portion of the cabin frame, and a pair of right and left second arms rotatably coupled to the first arms, and the second arms can be attached to and detached from the cargo bed so as to be located behind the rear seat.

With the above configuration, the link mechanism which can change the position of the screen shield between the expanded position and the non-expanded position can be easily formed.

According to the present invention, preferably, the link mechanism has a pair of right and left first arms rotatably coupled to the upper portion of the cabin frame, a pair of right and left intermediate arms rotatably coupled to the first arms, and a pair of right and left second arms rotatably coupled to the intermediate arms, and the second arms are attached to the rear seat.

With the above configuration, since the second arms of the link mechanism are attached to the rear seat, the arms of the link mechanism are located in a more front direction. Thus the housing space of the cargo bed can be expanded.

According to the present invention, preferably, in the configuration in which the link mechanism has a pair of right and left first arms rotatably coupled to the upper portion of the cabin frame, a pair of right and left intermediate arms rotatably coupled to the first arms, and a pair of right and left second arms rotatably coupled to the intermediate arms, and the second arms are attached to the rear seat, the intermediate arms can be attached to and detached from one end and the other end of each of the second arms.

With the above configuration, the positions of the intermediate arms can be moved in a front-rear direction in 2 passengers transformation. The housing space of the cargo bed can be expanded and contracted in the 2 passengers transformation.

According to the present invention, preferably, the cargo bed has right and left stationary side panels and right and left expandable side panels expandable to the rear riding space, the link mechanism has a pair of right and left first arms rotatably coupled to the upper portion of the cabin frame, a pair of right and left intermediate arms rotatably coupled to the first arms, and a pair of right and left second arms rotatably coupled to the intermediate arms, and the second arms are attached to the expandable side panels.

With the above configuration, in this embodiment, the cargo bed can be lifted without detaching the screen shield. The intermediate arms of the link mechanism are lifted so that the cargo bed can easily be placed in a dump state in which the cargo bed is tilted downward in a rear direction.

DETAILED DESCRIPTION OF THE INVENTION

First Embodiment of the Present Invention

Figure 1:
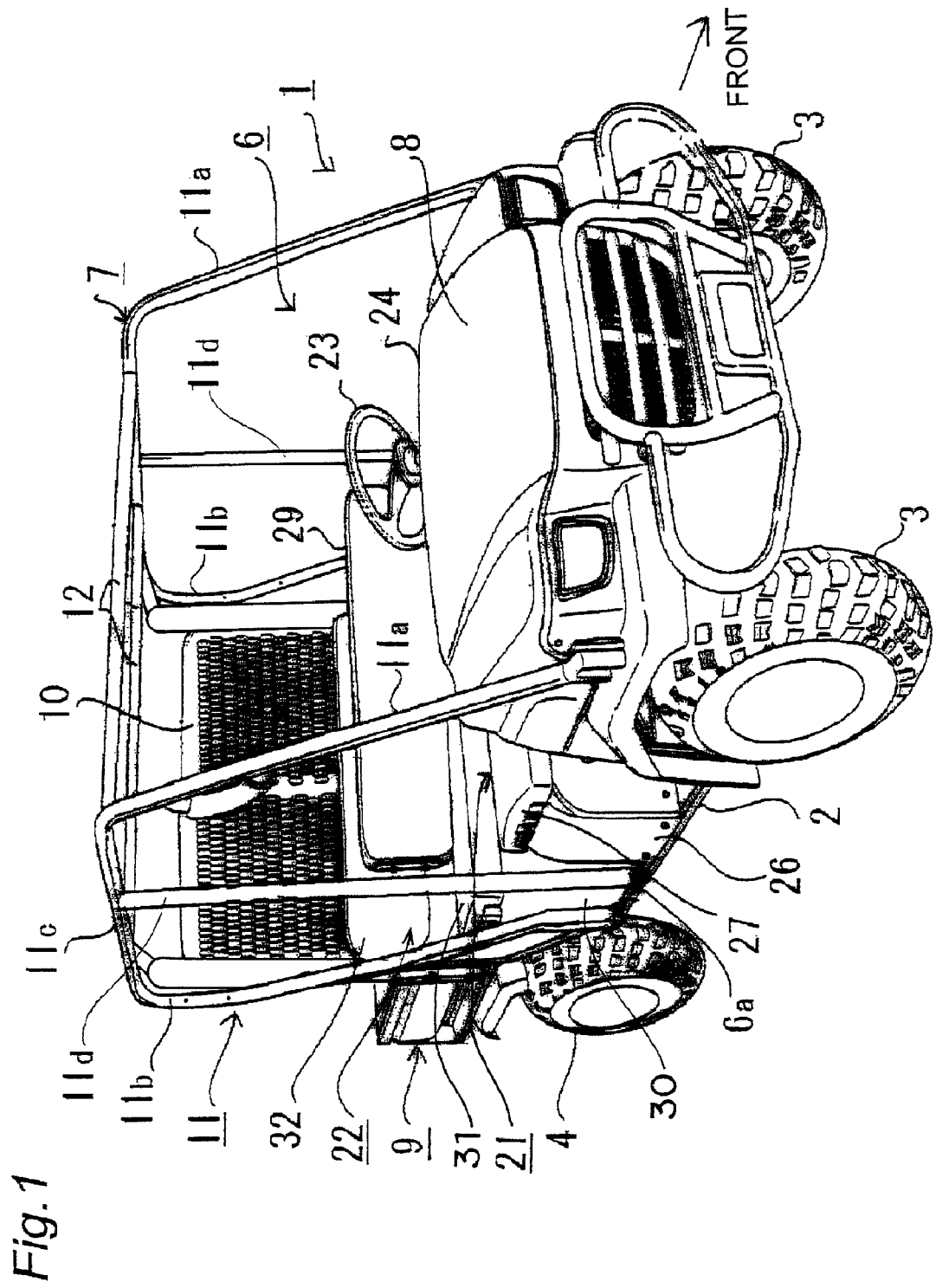
FIG. 1 is an overall perspective view of a pick-up style utility vehicle according to a first embodiment of the present invention.
Figure 2:
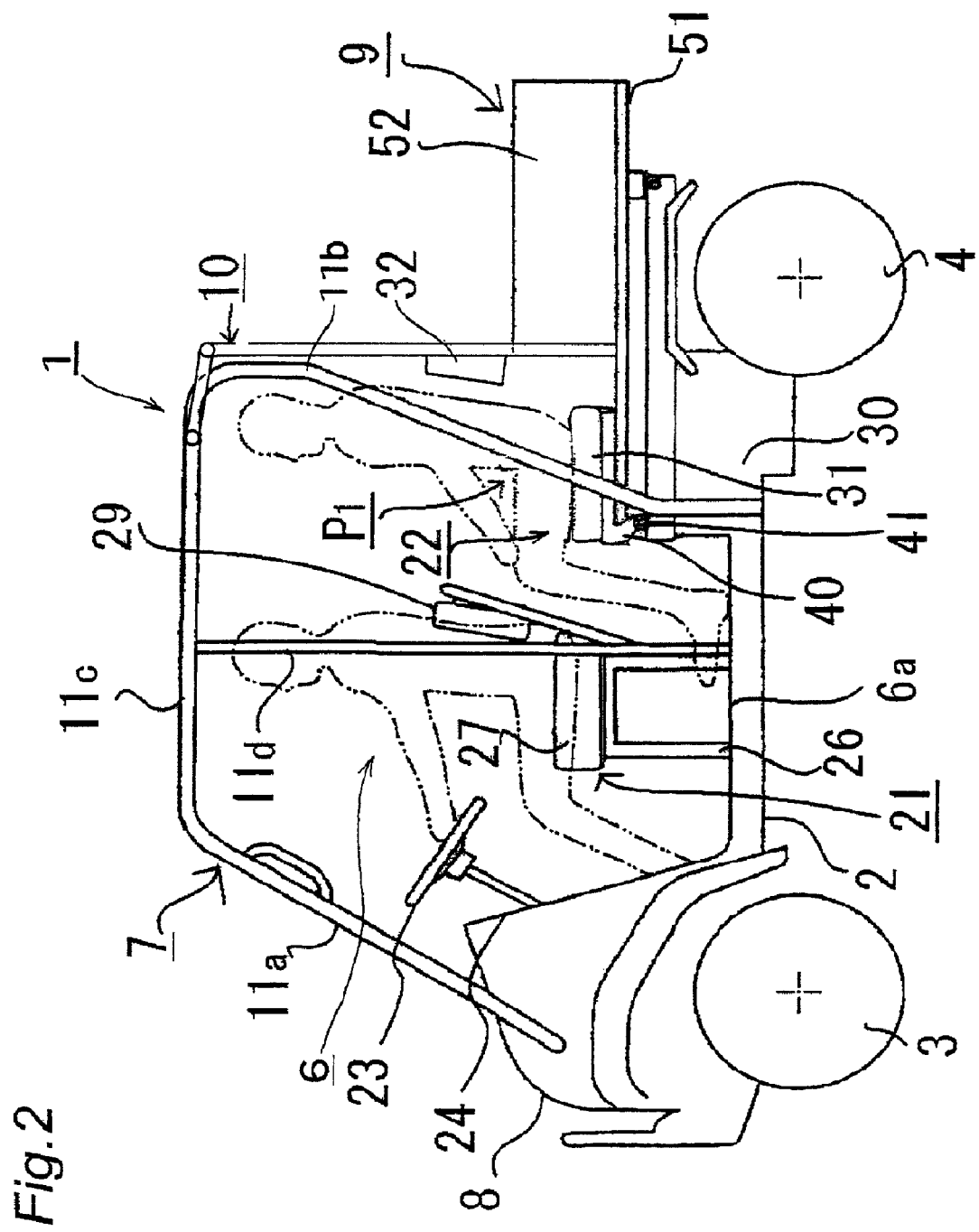
FIG. 2 is a left side view of the pick-up style utility vehicle of FIG. 1 when a cargo bed is in a non-expanded state.
Figure 3:
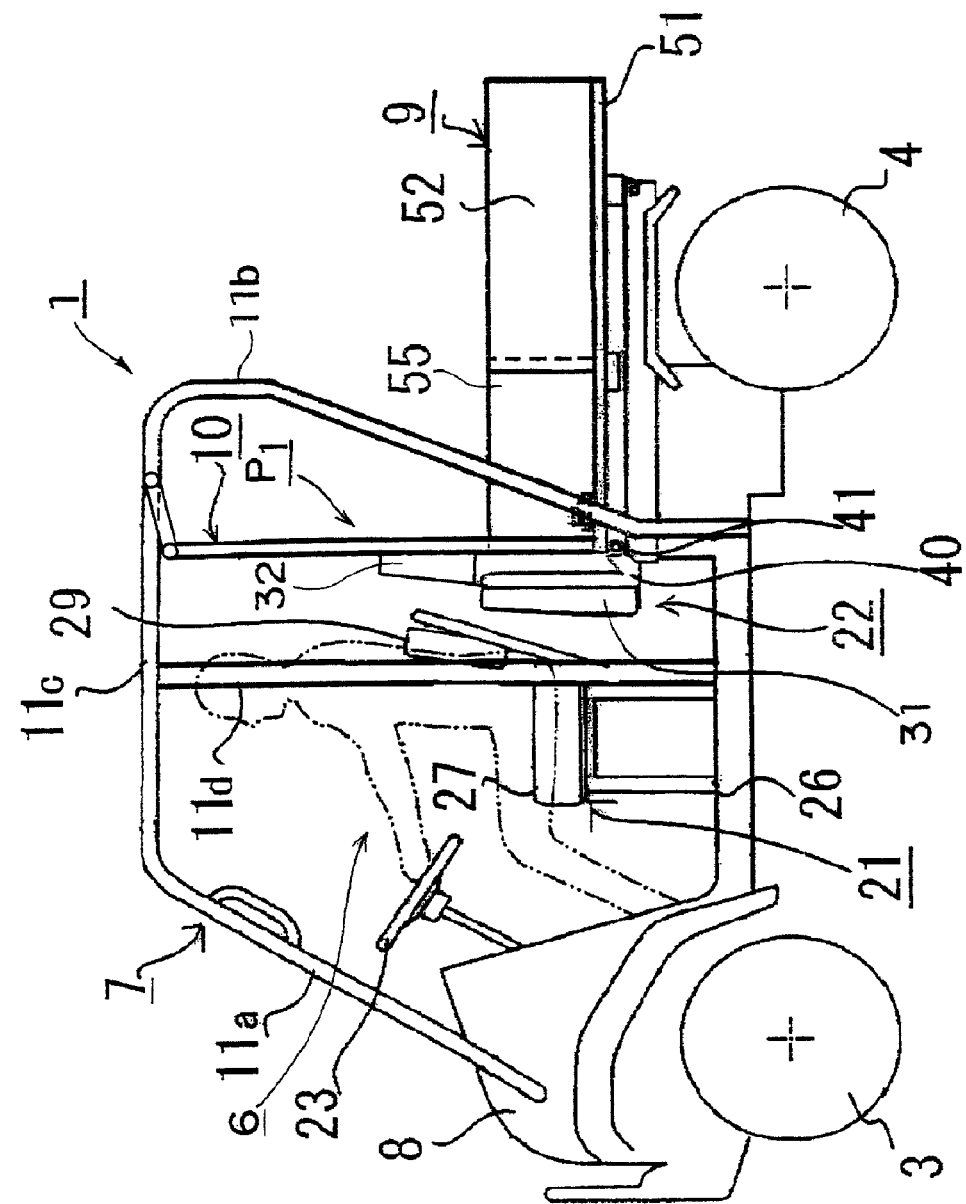
FIG. 3 is a left side view of the pick-up style utility vehicle of FIG. 1 when the cargo bed is in an expanded state.

FIGS. 1 to 3 show a pick-up style utility vehicle 1 with an expandable cargo bed according to a first embodiment of the present invention. The pick-up style utility vehicle 1 can be changed between 4 passengers transformation contracting a cargo bed 9, as shown in FIG. 2 and 2 passengers transformation folding a rear seat 22 and expanding the cargo bed 9 in a front direction, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be adjustable in a front-rear direction.

The cabin frame 7 surrounding cabin 6 has a pair of right and left side frame members 11 formed in an inverted U-shape and made of metal pipes, and a plurality of cross frame members 12 made of metal pipes coupling the side frame members 11. Each of the side frame members 11 has a front side portion 11a extended in a rear direction and in an up direction from near the right or left side portion of the hood 8, a rear side portion 11b extended in a substantially up direction from the right or left side portion at the rear end of the cabin 6, an upper side portion 11c integrally coupling the upper end of the front side portion 11a and the upper end of the rear side portion 11b and extended in a front-rear direction, and an intermediate longitudinal portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

FIG. 2 is a left side view of the pick-up style utility vehicle 1 in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portions 11d. The bench-shaped front seat 21 is typically extended in a right-left direction to near the right and left ends of the cabin 6. With this configuration, two persons can be seated on the bench-shaped front seat 21 side by side. A driver can be seated on one of seating areas (left side) and a passenger can be seated on the other seating area. The bench-shaped rear seat 22 has a seat bottom 31 arranged on the upper side of a box 30 housing an engine (not shown). As in the front seat 21, the seat bottom 31 is extended in a right-left direction to near the right and left ends of the cabin 6. Therefore, two passengers can be seated on the bench-shaped rear seat 22 side by side.

The configuration of the rear seat 22 will be described in detail. The seat bottom 31 is fixed onto the upper surface of a supporting base 40. The front end of the supporting base 40 is rotatably supported at the front upper end of the box 30 via hinges 41.

FIG. 3 is a left side view of the pick-up style utility vehicle 1 in the 2 passengers transformation. The seat bottom 31 is rotated about the hinges 41 so as to become in a substantially vertical state so that the rear seat 22 becomes in a retracted state. The rear seat 22 is retracted to use a rear portion riding space P1 as the forward expanded space of the cargo bed 9.

Figure 4:
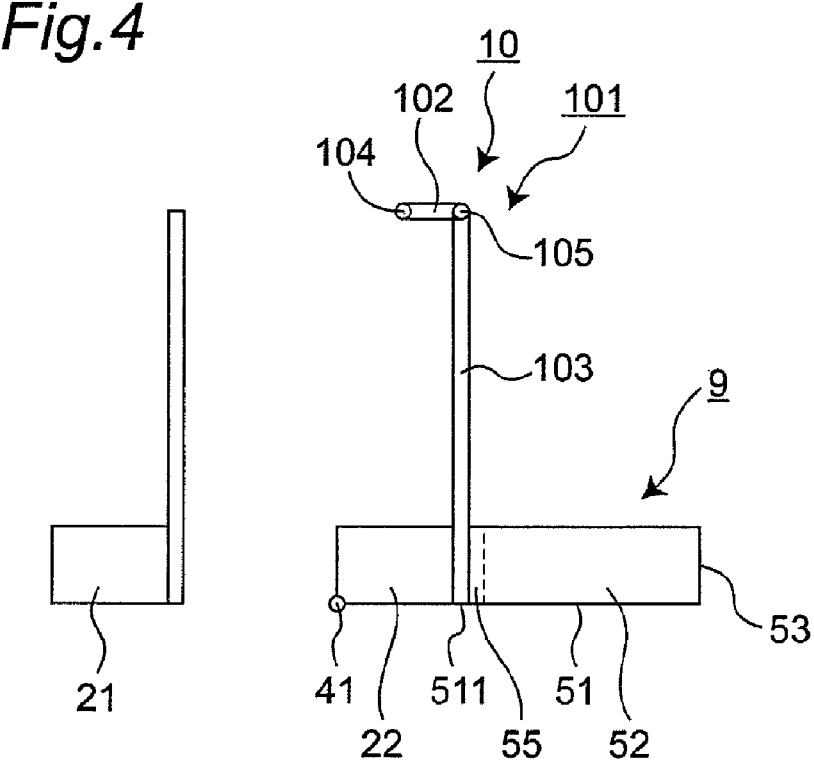
FIG. 4 is a left side schematic diagram of the expandable cargo bed 9 and the screen shield 10 in 4 passengers transformation.
Figure 5:
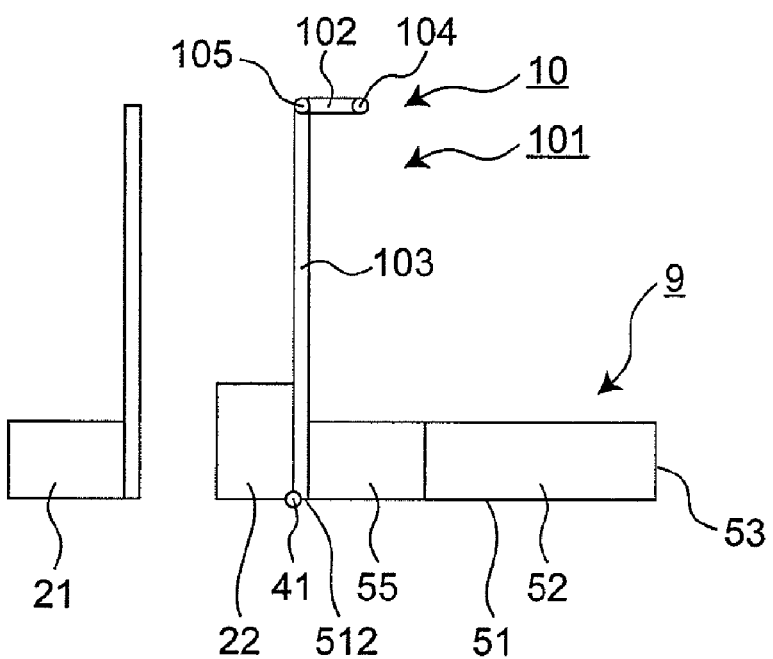
FIG. 5 is a left side schematic diagram of expandable cargo bed 9 and screen shield 10 in 2 passengers transformation.

The configuration of the expandable cargo bed 9 and the screen shield 10 will be described in detail. FIG. 4 is a left side schematic diagram of the expandable cargo bed 9 and the screen shield 10 in the 4 passengers transformation. FIG. 5 is a left side schematic diagram of the expandable cargo bed 9 and the screen shield 10 in the 2 passengers transformation. The screen shield 10 has a link mechanisms 101. The link mechanisms 101 have a pair of right and left arms 102 and 103 and a pair of right and left fulcrums 104 and 105. The fulcrums 104 are provided on the upper side portions 11c of the side frame members 11 of the cabin frame 7. The arms 102 are rotatably coupled via the fulcrums 104. The arms 102 and 103 are rotatably coupled via the fulcrums 105. A length of the arms 103 is expandable and contractable, while the arms 103 are inserted into and fixed to the bottom plate 51. A net of the screen shield 10 is provided between the pair of right and left arms 103.

The cargo bed 9 has, as a basic configuration, a bottom plate 51, a pair of stationary side panels 52 provided substantially perpendicular to the bottom plate 51 along the right and left ends of the bottom plate 51, openable and closeable gate-shaped rear panels 53 provided at the rear ends of the bottom plate 51, and a pair of right and left expandable side panels 55 for the expanding cargo bed 9 in a front direction.

The lower portions of the arms 103 are inserted into and fixed to the bottom plate 51. The arms 103 are inserted into an intermediate portion 511 or a front portion 512 in a front-rear direction of the bottom plate 51. When the arms 103 are inserted into the intermediate portion 511, the pick-up style utility vehicle is in the 4 passengers transformation. When the arms 103 are inserted into the front portion 512, the pick-up style utility vehicle is in the 2 passengers transformation. A means for fixing inserted the arms 103 to the bottom plate 51 may be of an insertion type, a hook type, or a pin type inserting pins from the right and left side panels of the bottom plate 51.

The operation of changing the 4 passengers transformation shown in FIG. 4 to the 2 passengers transformation shown in FIG. 5 and expanding the cargo bed 9 will be described.

When the 4 passengers transformation is changed to the 2 passengers transformation, as shown in FIG. 5, the rear seat 22 is rotated in a front direction about the hinges 41 so as to become in a substantially erected state.

The arms 103 are pulled out from the intermediate portion 511 of the bottom plate 51. The arms 102 are rotated in a front direction via fulcrums 104.

The arms 103 are rotated via fulcrums 105 and are inserted into and fixed to the front portion 512 of the bottom plate 51 located behind the rear seat 22 in a substantially erected state.

The pair of right and left closed expandable side panels 55 are opened in a front direction to form the side panels in front of the stationary side panels 52.

As described above, in this embodiment, it is not necessary to lift and move the screen shield 10. Thus, the operation of changing the 4 passengers transformation to the 2 passengers transformation can be easily performed by one person.

When the 2 passengers transformation shown in FIG. 5 is changed to the 4 passengers transformation shown in FIG. 4 so that the cargo bed 9 is in a non-expanded state, the expanding operation may be reversed. It is not necessary to lift and move the screen shield 10. The operation of changing the 2 passengers transformation to the 4 passengers transformation can be easily performed by one person.

To stably move the arms 103, stoppers are preferably provided in the fulcrums 104 so as to define the rotation range of the arms 102.

Since the length of the arms 103 is expandable and contractable, the arms 103 are easily inserted into or pulled out from the intermediate portion 511 or the front portion 512 of the bottom plate 51.

The fixing mechanism for fixing the screen shield 10 to the bottom plate 51 in the 4 passengers transformation and the 2 passengers transformation is not limited to the insertion type and the pin type. Various fixing means such as a bolt type and a magnet type can be used.

Second Embodiment

Figure 6:
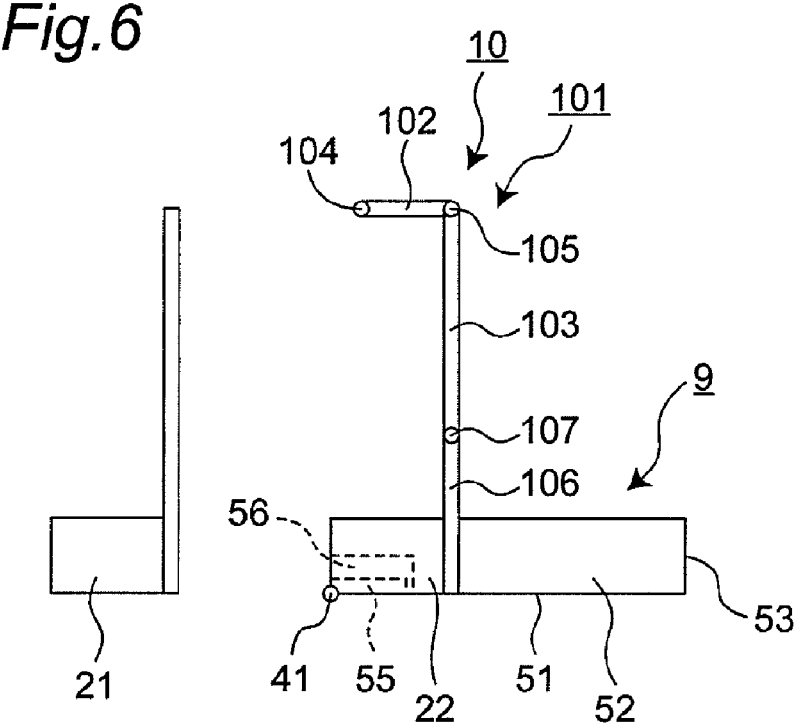
FIG. 6 is a left side schematic diagram of expandable cargo bed 9 and screen shield 10 in the 4 passengers transformation according to a second embodiment of the present invention.
Figure 7:
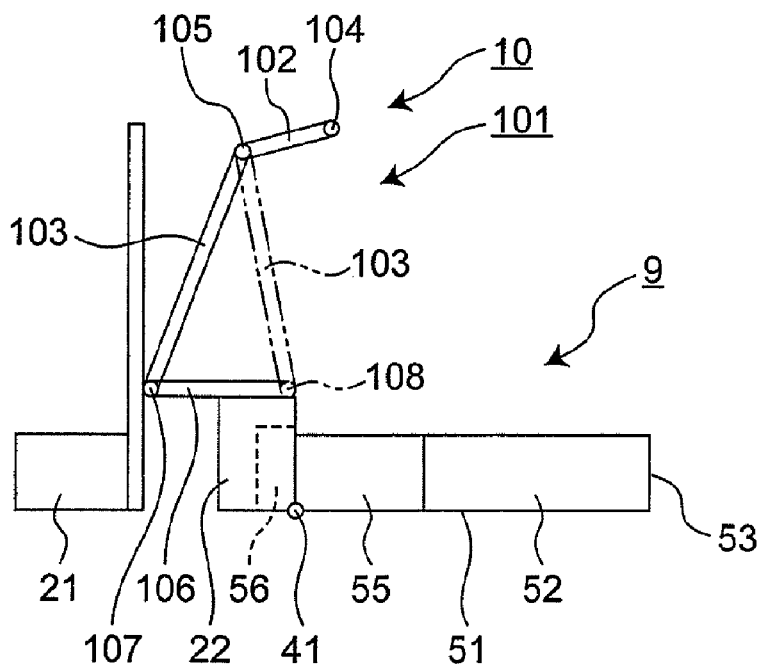
FIG. 7 is a left side schematic diagram of expandable cargo bed 9 and screen shield 10 in the 2 passengers transformation.

FIGS. 6 and 7 are a second embodiment of the present invention. FIG. 6 is a left side schematic diagram of the expandable cargo bed 9 and the screen shield 10 in the 4 passengers transformation. FIG. 7 is a left side schematic diagram of the expandable cargo bed 9 and the screen shield 10 in the 2 passengers transformation. The second embodiment has the same configuration as that of the first embodiment except that the following configurations (a) and (b) are different. Like components are indicated by like reference numerals.

(a) As shown in FIG. 6, in the second embodiment, the link mechanisms 101 of screen shield 10 has a pair of right and left arms 106 and a pair of right and left fulcrums 107 in addition to the arms 102 and 103 and the fulcrums 104 and 105. The arms 103 and 106 are rotatably coupled via the fulcrums 107. The arms 106 are attached to the rear surface of the rear seat 22.

(b) As shown in FIG. 6, the expandable side panels 55 are housed in a housing space 56 in the bottom portion of the rear seat 22. As shown in FIG. 7, in the 2 passengers transformation, the expandable side panels 55 are opened in a rear direction from the rear seat 22 in a substantially erected state to form the side panels in front of the stationary side panels 52.

The operation of changing the 4 passengers transformation shown in FIG. 6 to the 2 passengers transformation shown in FIG. 7 and expanding the cargo bed 9 will be described.

When the 4 passengers transformation is changed to the 2 passengers transformation, as shown in FIG. 7, the rear seat 22 is rotated in a front direction about the hinges 41 so as to become in a substantially erected state. The arms 106 are attached to the rear surface of the rear seat 22 and become in a substantially horizontal state in the upper portion of the rear seat 22 in a substantially erected state.

The arms 106 become in a substantially horizontal state and, at the same time, the arms 102 are rotated in a front direction via the fulcrums 104 and are tilted downward in a front direction from a substantially horizontal state. The arms 103 are rotated via the fulcrums 105 and 107 and are tilted downward in a front direction from a substantially vertical state.

The pair of right and left expandable side panels 55 housed in the housing space 56 of the rear seat 22 are opened in a rear direction to form the side panels in front of the stationary side panels 52.

As described above, in this embodiment, it is not necessary to lift and move the screen shield 10. The operation of changing the 4 passengers transformation to the 2 passengers transformation can be easily performed by one person.

Since the arms 106 are attached to the rear surface of the rear seat 22, the arms 103 are located in a more front direction. Thus, the housing space of the cargo bed 9 can be expanded.

Since the expandable side panels 55 are housed in the rear seat 22, after the expandable side panels 55 form the side panels, the housing space 56 of the rear seat 22 is empty. Thus, the housing space of the cargo bed 9 can be expanded.

Modification Example of the Second Embodiment

The arms 103 and 106 may be attachable and detachable at the fulcrums 107 and 108. In this case, as indicated by the imaginary line of FIG. 7, the arms 103 can be coupled to the arms 106 via the fulcrums 108.

According to the modification example, in the 2 passengers transformation, the lower end positions of the arms 103 can be moved in a front-rear direction. The housing space of the cargo bed 9 can be expanded and contracted.

Third Embodiment

Figure 8:
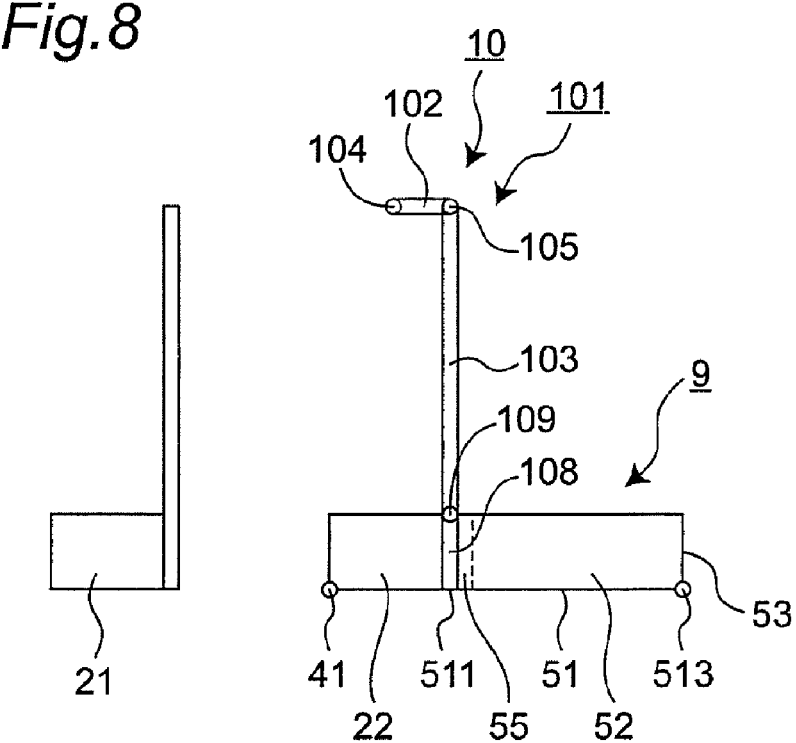
FIG. 8 is a left side schematic diagram of expandable cargo bed 9 and screen shield 10 in the 4 passengers transformation according to a third embodiment of the present invention.
Figure 9:
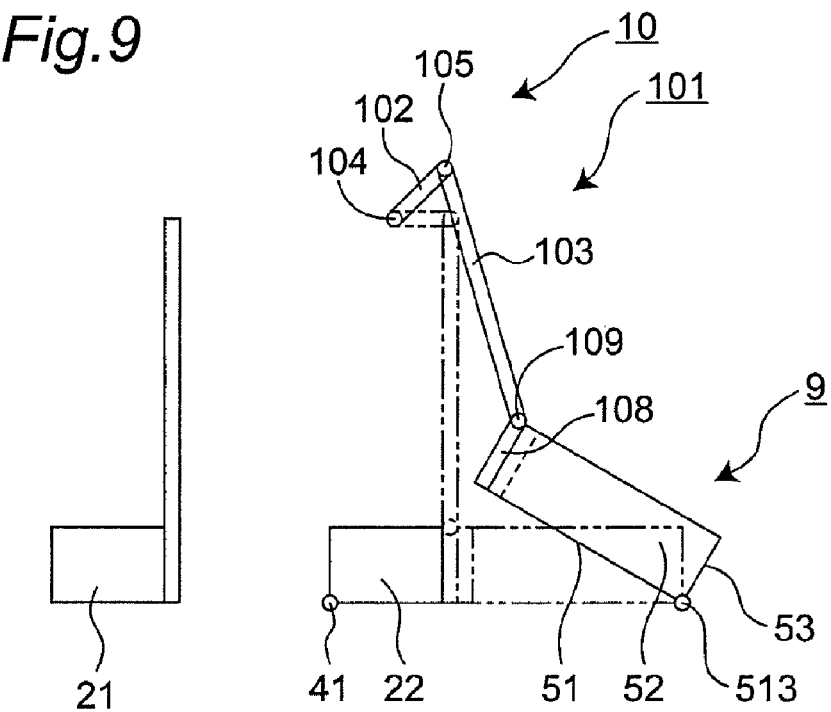
FIG. 9 is a left side schematic diagram in the state that cargo bed 9 is lifted in FIG. 8.
Figure 10:
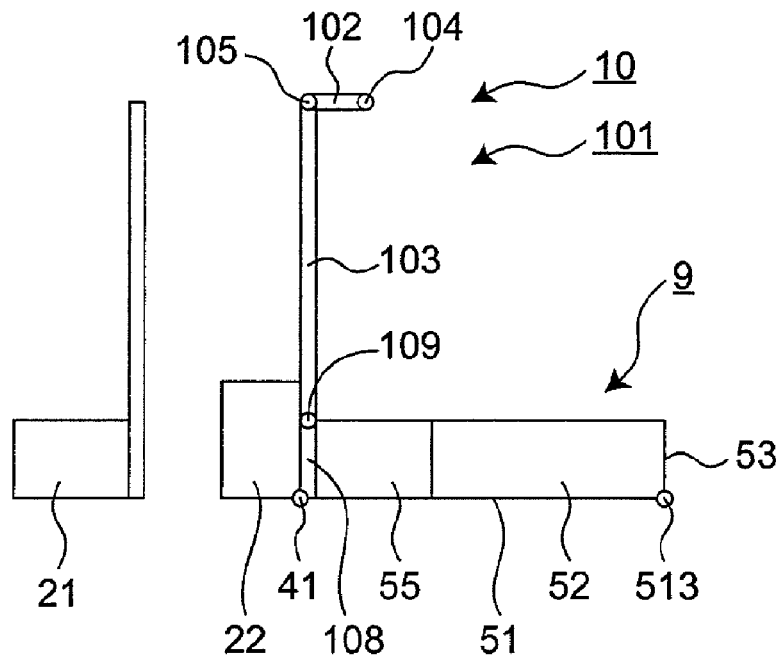
FIG. 10 is a left side schematic diagram of expandable cargo bed 9 and screen shield 10 in the 2 passengers transformation according to the third embodiment of the present invention.
Figure 11:
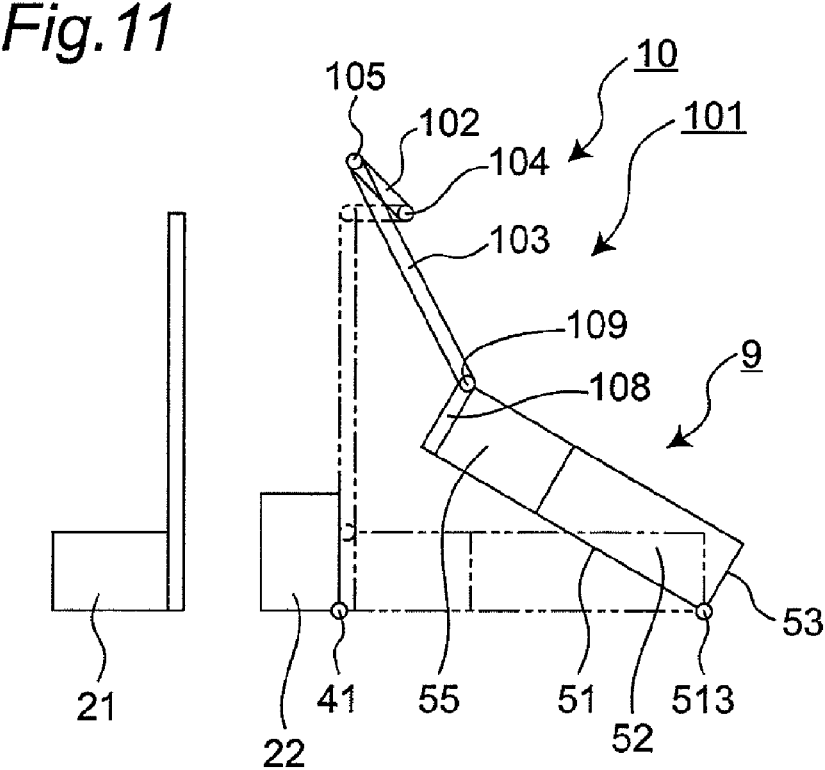
FIG. 11 is a left side schematic diagram in the state that cargo bed 9 is lifted in FIG. 10.

FIGS. 8 to 11 are a third embodiment of the present invention. FIG. 8 is a left side schematic diagram of the expandable cargo bed 9 and the screen shield 10 in the 4 passengers transformation. FIG. 9 is a left side schematic diagram of the state of lifting the cargo bed 9 in FIG. 8. FIG. 10 is a left side schematic diagram of the expandable cargo bed 9 and the screen shield 10 in the 2 passengers transformation. FIG. 11 is a left side schematic diagram of the state of lifting the cargo bed 9 in FIG. 10. The third embodiment has the same configuration as that of the first embodiment except that the following configurations (c) and (d) are different. Like components are indicated by like reference numerals.

(c) As shown in FIG. 8, in the third embodiment, the link mechanisms 101 of screen shield 10 has a pair of right and left arms 108 and a pair of right and left fulcrums 109 in addition to the arms 102 and 103 and the fulcrums 104 and 105. The arms 103 and 108 are rotatably coupled via the fulcrums 109. The arms 108 are attached to the expandable side panels 55.

(d) The bottom plate 51, the stationary side panels 52, and the rear panel 53 of the cargo bed 9 are rotatable via hinges 513.

To change the state shown in FIG. 8 to the state of lifting the cargo bed 9 shown in FIG. 9, the arms 103 are lifted in an up direction about the fulcrums 104. As a result, the fulcrums 105 are moved in an up direction, and the arms 102 in a substantially horizontal state are rotated in a front direction about the fulcrums 104 and are tilted downward in a front direction. The arms 103 in a substantially vertical state are tilted downward in a rear direction according to the movement of the fulcrums 105 in an up direction. The cargo bed 9 is lifted in an up direction by being rotated about the hinges 513 and is placed in a dump state in which the cargo bed 9 is tilted downward in a rear direction. Accordingly, the loading and unloading of a load on the cargo bed 9 is easy.

In this embodiment, the cargo bed 9 can be lifted without detaching the screen shield 10. The arms 103 of the link mechanisms 101 of the screen shield 10 are lifted so that the cargo bed 9 can easily be placed in a dump state in which the cargo bed 9 is tilted downward in a rear direction.

FIGS. 10 and 11 are schematic diagrams of assistance in explaining the lifting of the cargo bed 9 in the 2 passengers transformation. The operation of changing the 4 passengers transformation shown in FIG. 8 to the 2 passengers transformation shown in FIG. 10 is the same as the first embodiment.

To change the state shown in FIG. 10 to the state of lifting the cargo bed 9 shown in FIG. 11, the arms 103 are lifted in an up direction about the fulcrums 104. As a result, the fulcrums 105 are moved in an up direction, and the arms 102 in a substantially horizontal state are rotated in a rear direction about the fulcrums 104 and are tilted downward in a rear direction. The arms 103 in a substantially vertical state are tilted downward in a rear direction according to the movement of the fulcrums 105 in an up direction. As a result, the cargo bed 9 is lifted in an up direction by being rotated in a rear direction about the hinges 513 and is placed in a dump state in which the cargo bed 9 is tilted downward in a rear direction. The loading and unloading of a load loaded on the cargo bed 9 are easy.

In this embodiment, the cargo bed 9 can be lifted without detaching the screen shield 10. The arms 103 of the link mechanisms 101 of the screen shield 10 are lifted so that the cargo bed 9 can easily be placed in a dump state in which the cargo bed 9 is tilted downward in a rear direction.

Figure 12:
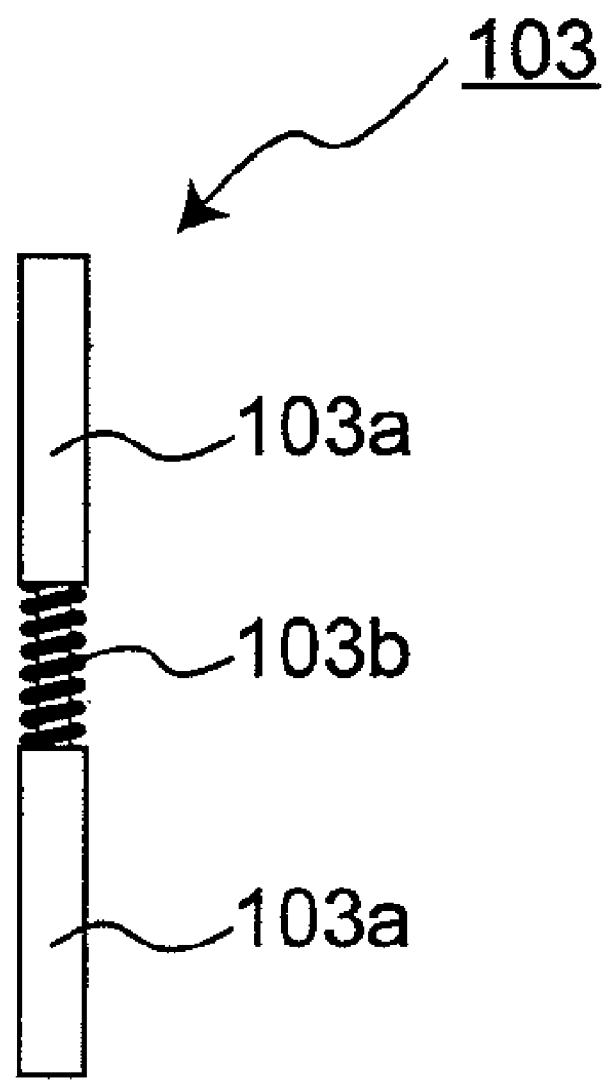
FIG. 12 is a schematic diagram of the arm 103 of the link mechanism 101 according to the third embodiment of the present invention.
Figure 13:
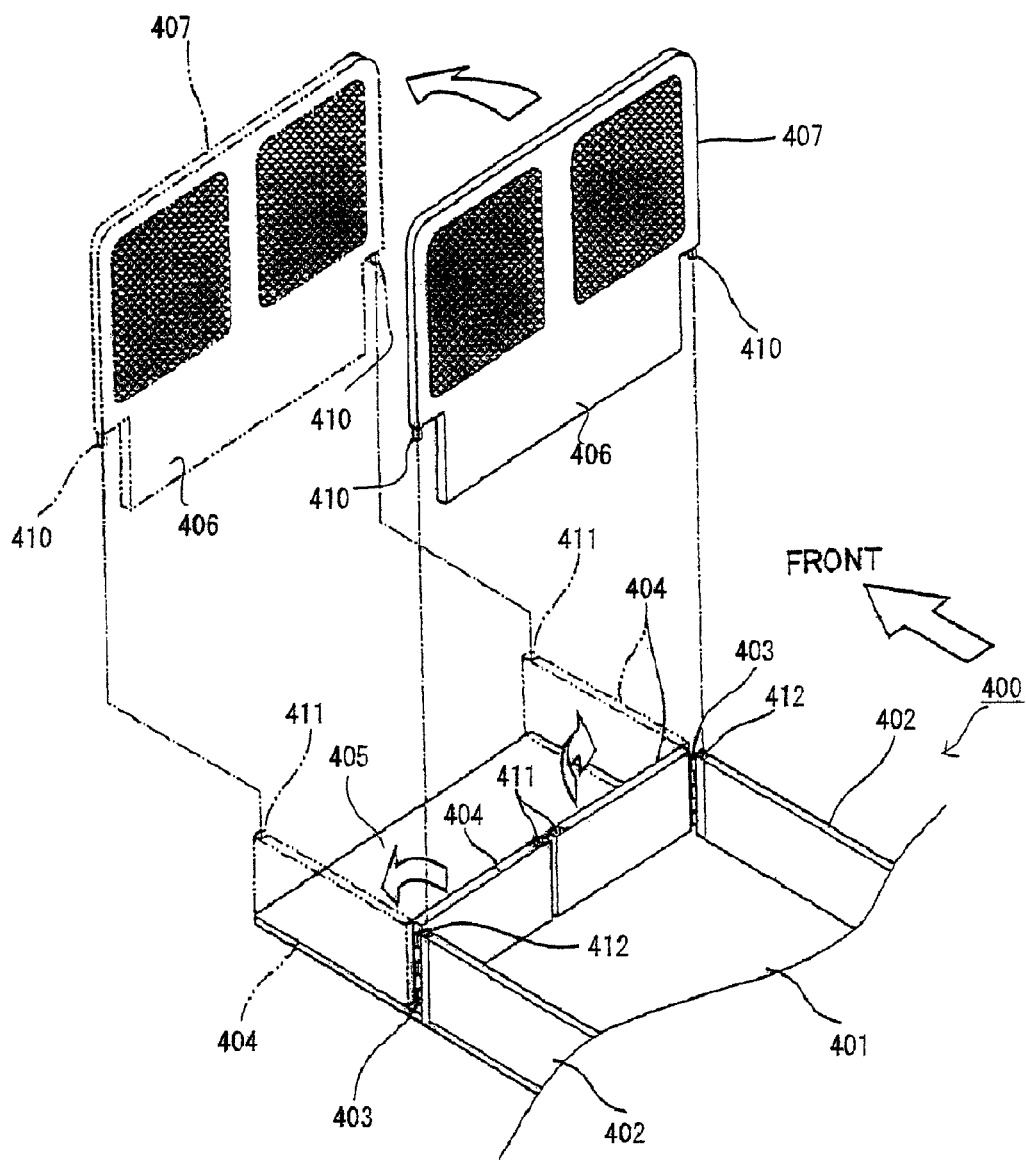
FIG. 13 is a perspective view of a cargo bed and a screen shield of the related art.

FIG. 12 is a schematic diagram of the arm 103 of link mechanism 101. As shown in FIG. 12, the arm 103 preferably has a body portion 103a and a spring portion 103b. The arm 103 has the spring portion 103b so that the arm 103 can be easily expanded and contracted in a longitudinal direction. Therefore, the arm 103 for changing the 4 passengers transformation to the 2 passengers transformation, changing the 2 passengers transformation to the 4 passengers transformation, and lifting the cargo bed 9 can be easily lifted.

In this embodiment, the screen shield 10 and the cargo bed 9 are coupled, however, the screen shield 10 and the cargo bed 9 need not be coupled. The cargo bed 9 can be placed in a dump state in which the cargo bed 9 is tilted downward in a rear direction independently of the operation of the link mechanisms 101 of the screen shield 10.

The present invention is not limited to the configurations of the above embodiments and includes various modification examples contemplated in the scope without departing from the contents described in the scope of the claims.

The invention claimed is:

1. A pick-up style utility vehicle comprising:

a front seat;

a rear seat;

a cargo bed behind the rear seat;

a cabin frame surrounding a riding space; and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, wherein the screen shield has a link mechanism, and wherein the screen shield is coupled to an upper portion of the cabin frame by the link mechanism such that the screen shield can be shifted between a position in the expanded state and a position in the non-expanded state, wherein the cargo bed has right and left stationary side panels and right and left expandable side panels expandable to the rear riding space, wherein the link mechanism includes:
(i) a pair of right and left first arms rotatably coupled to the upper portion of the cabin frame;
(ii) a pair of right and left intermediate arms rotatably coupled to the first arms; and
(iii) a pair of right and left second arms rotatably coupled to the intermediate arms, the second arms being attached to the expandable side panels.

2. The pick-up style utility vehicle according to claim 1, wherein the screen shield is connected to and extends between the left and right intermediate arms.

3. The pick-up style utility vehicle according to claim 2, wherein the cargo bed is movable between a non-lifted state and a lifted state, the cargo bed being tilted downward in the lifted state to unload cargo from the cargo bed, and
wherein the cargo bed is movable between the non-lifted state and the lifted state when in the expanded state and when in the non-expanded state.

4. The pick-up style utility vehicle according to claim 3, wherein the screen shield pivots as the cargo bed moves between the non-lifted state and the lifted state.

5. A pick-up style utility vehicle comprising:
a front seat;
a rear seat;
a cargo bed behind the rear seat;
a cabin frame surrounding a riding space; and
a screen shield partitioning the cargo bed and a rear riding space in front of the cargo bed,
wherein the cargo bed can be changed between an expanded state in which the cargo bed is expanded in a front direction to the rear riding space and a non-expanded state not occupying the rear riding space,
wherein the screen shield has a link mechanism, and
wherein the screen shield is coupled to an upper portion of the cabin frame by the link mechanism such that the screen shield can be shifted between a position in the expanded state and a position in the non-expanded state,
wherein the link mechanism includes:
(i) a pair of right and left first arms rotatably coupled to the upper portion of the cabin frame;
(ii) a pair of right and left intermediate arms rotatably coupled to the first arms; and
(iii) a pair of right and left second arms rotatably coupled to the intermediate arms,
wherein the screen shield is connected to and extends between the left and right intermediate arms,
wherein the cargo bed is movable between a non-lifted state and a lifted state, the cargo bed being tilted downward in the lifted state to unload cargo from the cargo bed,
wherein the cargo bed is movable between the non-lifted state and the lifted state when in the expanded state and when in the non-expanded state, and
wherein the screen shield pivots as the cargo bed moves between the non-lifted state and the lifted state.

6. The pick-up style utility vehicle according to claim 5, wherein the cargo bed has right and left stationary side panels and right and left expandable side panels expandable to the rear riding space.

* * * * *